United States Patent

[11] 3,632,997

[72] Inventor James W. Froemke
Rochester, Minn.
[21] Appl. No. 89,920
[22] Filed Nov. 16, 1970
[45] Patented Jan. 4, 1972
[73] Assignee International Business Machines Corporation
Armonk, N.Y.

[54] BIDIRECTIONAL COUNTER
9 Claims, 2 Drawing Figs.

[52] U.S. Cl. .......... 235/92 EV, 235/92 R, 235/92 LG, 328/44, 307/222
[51] Int. Cl. .......... H03k 21/06, G06m 3/14
[50] Field of Search .......... 235/92 LG, 92 EV; 328/44; 307/222

[56] References Cited
UNITED STATES PATENTS
2,823,856 2/1958 Booth et al. .......... 235/92 X
2,999,207 9/1961 Quynn .......... 235/92 X
3,391,342 7/1968 Gordon et al. .......... 328/44

*Primary Examiner*—Thomas A. Robinson
*Assistant Examiner*—Joseph M. Thesz, Jr.
*Attorney*—Hanifin and Jancin

ABSTRACT: A counter including a plurality of triggers changed in condition by signal transitions applied thereto and disposed in a series of tandem connected stages each of which also includes an exclusive OR circuit driven by the trigger and driving an AND circuit, the AND circuit of each preceding stage being connected to drive the AND circuit of the succeeding stage, means providing an alternating clock signal for driving the trigger of the first stage and the AND circuits in the other stages, and a direction control bus constituting an input to the exclusive OR circuits for causing the counter to count up or count down under the influence of the clock signals depending on the potential applied to the direction control bus.

INVENTOR
JAMES W. FROEMKE
BY Keith J. Blum
ATTORNEY

TRUTH TABLE

| | STATE | TGR-1 | TGR-2 | TGR-3 | TGR-4 |
|---|---|---|---|---|---|
| ALL-ONE | 15 | 1 | 1 | 1 | 1 |
| | 14 | 0 | 1 | 1 | 1 |
| | 13 | 1 | 0 | 1 | 1 |
| | 12 | 0 | 0 | 1 | 1 |
| | 11 | 1 | 1 | 0 | 1 |
| | 10 | 0 | 1 | 0 | 1 |
| | 9 | 1 | 0 | 0 | 1 |
| | 8 | 0 | 0 | 0 | 1 |
| | 7 | 1 | 1 | 1 | 0 |
| | 6 | 0 | 1 | 1 | 0 |
| | 5 | 1 | 0 | 1 | 0 |
| | 4 | 0 | 0 | 1 | 0 |
| | 3 | 1 | 1 | 0 | 0 |
| | 2 | 0 | 1 | 0 | 0 |
| | 1 | 1 | 0 | 0 | 0 |
| ALL-ZERO | 0 | 0 | 0 | 0 | 0 |
| | 15 | 1 | 1 | 1 | 1 |
| | 14 | 0 | 1 | 1 | 1 |
| | 13 | 1 | 0 | 1 | 1 |
| | 12 | 0 | 0 | 1 | 1 |
| | 11 | 1 | 1 | 0 | 1 |
| | 10 | 0 | 1 | 0 | 1 |
| | 9 | 1 | 0 | 0 | 1 |
| | 8 | 0 | 0 | 0 | 1 |
| | 7 | 1 | 1 | 1 | 0 |
| | 6 | 0 | 1 | 1 | 0 |
| | 5 | 1 | 0 | 1 | 0 |
| | 4 | 0 | 0 | 1 | 0 |
| | 3 | 1 | 1 | 0 | 0 |
| | 2 | 0 | 1 | 0 | 0 |
| | 1 | 1 | 0 | 0 | 0 |
| ALL-ZERO | 0 | 0 | 0 | 0 | 0 |

COUNT DIRECTION

UP DOWN

FIG. 2

BIDIRECTIONAL COUNTER

BACKGROUND OF THE INVENTION

The invention relates to digital counters adapted for both forward and backward modes.

Reversible counters have previously been proposed, such as that described in the U.S. Pat. No. 2,823,856, to G. W. Booth et al., issued Feb. 18, 1958. The Booth et al., counter comprises a plurality of stages connected in tandem with each of the stages including a latch operated by DC voltage levels, an ordinary OR circuit connected to be driven by the latch, and an AND circuit connected to be driven by the OR circuit. The counter is made reversible by providing means for complementing the binary number registered in the counter, inserting the desired count, and recomplementing the new number now registered in the counter.

SUMMARY OF THE INVENTION

It is an object of the present invention to provide an improved counter which is simpler in construction particularly in that the direction of count may be reversed simply by providing different potentials on a direction control bus.

More particularly, it is an object of the invention to provide an improved counter of this type in which the different potentials of the direction control bus are applied onto exclusive OR circuits in the stages of the counter for reversing the counting action.

In brief, the improved counter of the invention comprises a plurality of stages that are connected in tandem, with each of the stages comprising a trigger caused to change in condition by a transition of an input signal. Each of the stages, in addition, has an exclusive OR circuit driven by the trigger of that stage and has an AND circuit driven by the OR circuit, and each of the AND circuits drives the trigger of the succeeding stage and also the AND circuit of the succeeding stage. A direction control bus is also connected as an input to each of the exclusive OR circuits, and a clock signal is applied to the trigger of the first stage and to the AND circuits of the succeeding stages so that the counter counts up for one voltage potential on the direction control bus and counts down for another potential on the direction control bus.

The invention consists of the novel constructions and arrangements of circuitry to be hereinafter described and claimed for carrying out the above-stated objects, and such other objects, as will be apparent from the following description of a preferred form of the invention, illustrated with reference to the accompanying drawings, wherein:

FIG. 1 is a diagram of a bidirectional counter embodying the principles of the invention; and FIG. 2 is a table showing the conditions of the various triggers in the counter as the counter counts up and counts down.

DESCRIPTION OF THE PREFERRED EMBODIMENT

Figure 1:
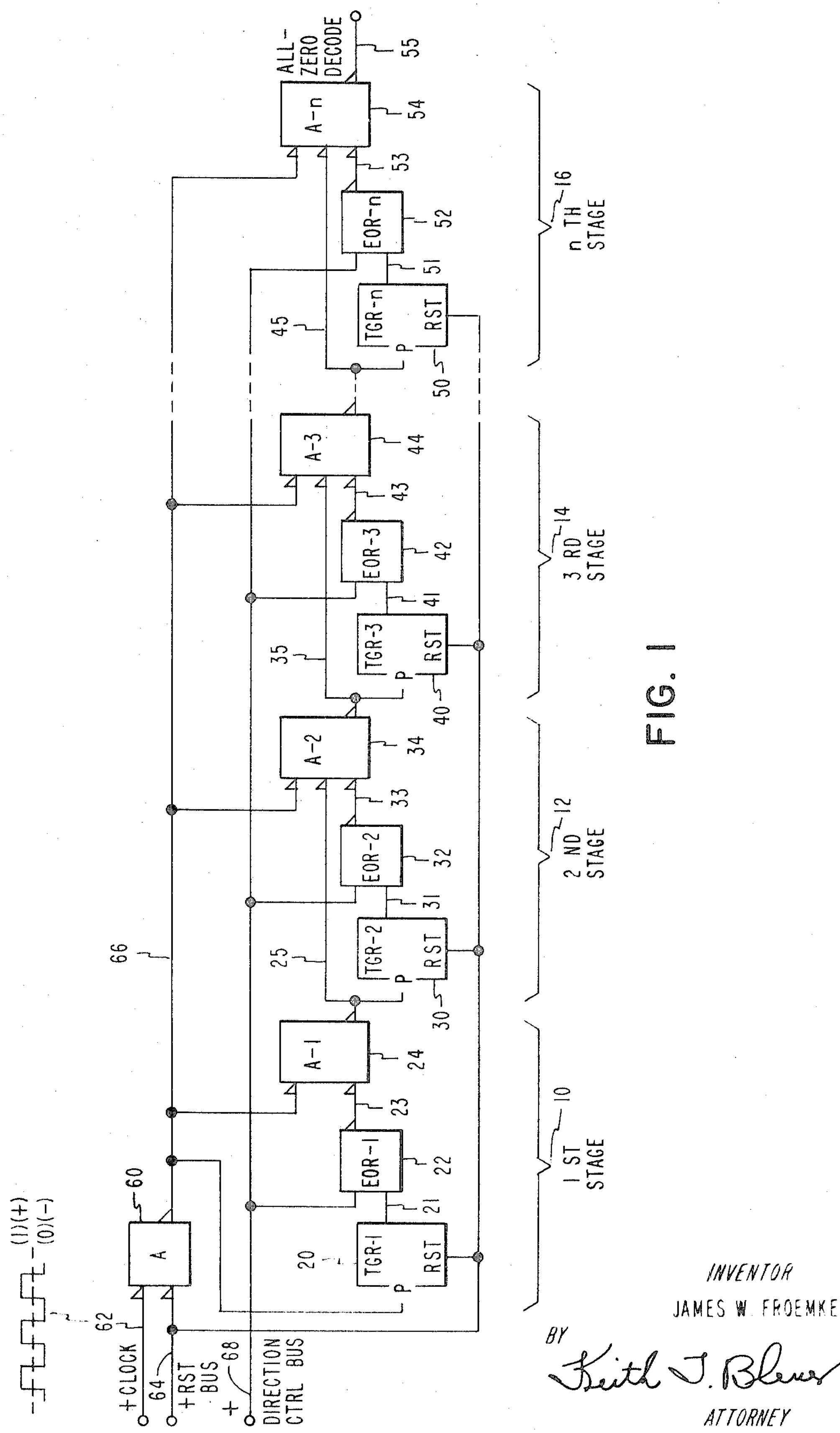

Referring now to the drawings and in particular to FIG. 1, the illustrated counter may be seen to comprise circuitry 10 for a first stage, circuitry 12 for a second stage, circuitry 14 for a third stage, and circuitry 16 for a fourth or $n^{th}$ stage.

The circuitry 10 comprises a trigger 20, an exclusive OR-circuit 22, and an AND-circuit 24. The other circuitries 12, 14, and 16 are similar to the circuitry 10 and comprise triggers 30, 40, and 50 similar to the trigger 20, exclusive OR-circuits 32, 42, and 52 similar to the OR-circuit 22, and AND-circuits 34, 44, and 54 similar to the AND-circuit 24.

An AND-circuit 60, which is similar to the AND-circuits 24, 34, 44, and 54, has two inputs 62 and 64. The input 62 has a clock signal applied thereto which alternates between a one or plus potential and a zero or minus potential. The lead 64 may be termed a reset bus and either has a plus or a minus signal applied thereto. The bus 64 is also connected to the triggers 20, 30, 40, and 50 and in particular to reset terminals thereof for the purpose of resetting the triggers to zero condition when a plus potential is applied to bus 64.

The AND-circuit 60 has an output lead 66 which is applied to the "P" or control terminal of the trigger 20 for the purpose of complementing or causing the trigger 20 to change state when a positive transition (a change from a minus potential to a plus potential) occurs on the lead 66. The lead 66 is also connected as an input to each of the AND-circuits 24, 34, 44, and 54.

A direction control bus 68, which is adapted to have either a plus or minus potential applied thereto, is connected as an input to each of the exclusive OR-circuits 22, 32, 42, and 52. The trigger 20 has its output in the form of a lead 21 which is connected as one of the two inputs to the exclusive OR-circuit 22, and OR-circuit 22 has an output in the form of lead 23 which is connected as an input to the associated AND-circuit 24. The AND-circuit 24 has an output in the form of a lead 25, and lead 25 is connected as an input or control with the trigger 30 of the circuitry 12 for the next highest stage and also as an input to the AND-circuit 34 of the circuitry 12.

The connections between the parts of the circuitries 12, 14, and 16 is the same as that in the circuitry 10 for the first stage in the counter. The triggers 30, 40, and 50 respectively have output leads 31, 41, and 51 connected with the associated OR-circuits 32, 42, and 52; and these OR-circuits respectively have output leads 33, 43, and 53 connected as inputs to the associated AND-circuits 34, 44, and 54. The AND-circuits 34 and 44 have output leads 35 and 45 which are connected with both the triggers 40 and 50 of the higher stage and also with the AND-circuits 44 and 54 of the higher stage. The lead 55 constituting the output of AND-circuit 54 carries at times an all zero decode signal as will be subsequently explained.

The exclusive OR-circuits 22, 32, 42, and 52 are of such construction to provide a plus output when the inputs are the same, either both plus or both minus. If the inputs are different, one being plus and one minus, the exclusive OR-circuits 24, 34, 44, and 54 in this case provide a minus output. Each of the AND-circuits 24, 34, 44, and 54 is of such construction that when all of the inputs to the AND-circuits are negative, the output is also negative. If any of the inputs are not negative, one or more having a plus potential applied to it, then the output of the AND-circuit is positive.

The triggers 20, 30, 40, and 50 are each of a construction so that the trigger is complemented or changed in state from a zero to a one condition or back from a one condition to a zero condition when a positive transition of voltage is put onto its "P" terminal. The triggers provide a plus potential on their output leads 21, 31, 41, and 51 when the triggers are in their one condition and provide a minus potential on the output leads when the triggers are in their zero condition. The triggers are also of such construction that when a plus potential is applied onto the reset bus 64 and thereby onto the "RST" terminals of the triggers, the triggers are forced into their zero states in which they apply a minus potential onto their output leads 21, 31, 41, and 51.

In operation, a plus potential is first applied onto the reset bus 64 and is maintained on this bus for a short time, and this potential applied onto the triggers 20, 30, 40, and 50, and particularly onto the reset terminals of these triggers, causes the triggers to go into their zero conditions, if the triggers were not previously in their zero conditions. In these conditions, the triggers all provide negative potentials on their output leads 21, 31, 41, and 51. The potential on the bus 64 is then made negative.

In order to count down with the counter, a plus potential is put on the direction control bus 68. When the trigger 20 is in its reset condition, it provides a minus output signal on lead 21, and, since the potentials on the inputs of the exclusive OR-circuit 22 are different, the OR-circuit 22 has a minus output which is applied as an input on the associated AND-circuit 24. Likewise the inputs to the exclusive OR-circuits 32, 42, and 52 are different, since the direction control bus 68 has a plus potential applied to it while the outputs of the triggers 20, 30, 40, and 50 are minus, and the OR-circuits 32, 42, and 52 apply minus inputs to the associated AND-circuits 34, 44, and 54.

The potential on the reset bus 64 is minus, and, therefore, the clock signal on lead 62 will simply, in effect, pass directly through the AND-circuit 60 to be applied on lead 66. On the first transition from minus to plus of the clock signal, this signal causes the setting of the trigger 20 from a zero to a one condition, and a setting of the other triggers 30, 40, and 50 takes place simultaneously as will now be described.

Before the first trigger 20 is toggled from a zero to a one state, the AND-circuit 24 effectively provides a straight through connection of the clock signal on lead 66 to the output lead 25, since the OR-circuit 22 has a minus output that is impressed as an input to the AND-circuit 24; and, therefore, the second trigger 30 is toggled from its zero to its one condition at the same time as the first trigger 20 is so toggled. The clock signal on the output lead 25 and the minus output of OR-circuit 32, on the first transition of the clock signal from minus to plus, causes this transition to pass directly through the AND-circuit 34 and to be effective on the trigger 40 for changing this trigger from its zero to its one condition, and AND-circuit 44 similarly passes the clock signal so that the trigger 50 is complemented from its zero to its one condition, with the changing in condition of all of the triggers 30, 40, and 50 occurring at the same instant and at the same time as trigger 20 is toggled. Therefore, on the first transition of the clock signal on lead 62 from minus to plus, subsequent to the application of a plus potential on the direction control bus 68, the triggers 20, 30, 40, and 50 are put into their one conditions, and this is indicated on the table of FIG. 2 opposite the "15" state located one step downwardly from the all zero state in which all of the triggers are in their zero conditions. The counter is now in condition for a count from 15 to 14 on the next positive transition of the clock signal on lead 62 from minus to plus. With all of the triggers 20, 30, 40, and 50 being in their one conditions, the signals on all of the output leads 21, 31, 41, and 51 are at plus potential.

After the triggers 20, 30, 40, and 50 have thus been put into their one conditions, the clock signal again alternates to its minus potential and then alternates back to plus potential. Since the reset bus continues with a minus potential on it, the AND-circuit 60 continues to transmit the clock signal directly therethrough, and this is applied directly onto the control terminal "P" of the first trigger 20. The potential of the control terminal "P" of the first trigger 20 thus goes negative along with the clock signal. The AND-circuit 24, however, prevents the minus transition of the clock signal from being impressed on the control terminal "P" of the trigger 30, since the exclusive OR-circuit 22 has its output remaining positive during the minus transition of the clock signal. The same is true with respect to the other triggers 40 and 50, with the AND-circuits 34 and 44 being prevented from transmitting clock signals, since the associated exclusive OR-circuits 32 and 42 continue to supply plus signals as inputs by means of leads 33 and 43 onto the associated AND-circuits 34 and 44. The only one of the triggers 20, 30, 40, and 50, therefore, that is subject to the minus transition of the clock signal at this time is the first trigger 20. When the clock signal then again makes its transition from minus to plus, the trigger 20 is caused to complement its state so as to go back to its zero state, and the counter as a whole is in its "14" state as indicated by the table of FIG. 2. The output of trigger 20 on lead 21 is now negative.

On the succeeding negative transition of the clock signal on lead 62, the input terminal "P" of the second trigger 30 goes negative for the reason that at this time the exclusive OR-circuit 22 has a negative output. As previously explained, the exclusive OR-circuits provide a minus output when one input is minus and the other is plus. The exclusive OR-circuit 22 thus provides a minus input on the AND-circuit 24 so that the clock signal passes directly therethrough. The trigger 30 thus at this time changes condition from one to zero, and the trigger 20 also changes condition from zero to one since the first trigger 20 always has the clock signal applied directly thereon through the AND-circuit 60. Thus, the first trigger 20 is now in its one condition while the second trigger 30 is in its zero condition, with the other triggers 40 and 50 remaining in their one conditions, so that the counter is in its "13" state as indicated by the FIG. 2 graph.

On the next transitions of the clock signal from plus to minus and then from minus to plus, the state of the first trigger 20 is changed from a one to a zero, but the transition of the clock signal is not transmitted through the AND-circuit 24 to be effective on the trigger 30, since the exclusive OR-circuit 22 at this time provides a plus signal on the lead 23; and the trigger 30 remains in its zero condition. The counter is then in its "12" condition as indicated by the FIG. 2 table.

On the next transitions from plus to minus and then from minus to plus of the clock signal on lead 62, the trigger 20 again changes state (from zero to one) as before. Since the trigger 20 is initially in its zero state, the AND-circuit 24 allows the clock signal transitions to be effective on the "P" terminal of the trigger 30, and the trigger 30 likewise changes state (from zero to one). As will be observed, the AND-circuit 34 has three inputs, namely one from AND-circuit 24 controlled by trigger 20 and the other from exclusive OR-circuit 32 controlled by trigger 30; and, at the time of the transitions of the clock signal from plus to minus, the signals on leads 25 and 33 are minus so that the clock signal is transmitted directly through the AND-circuit 34 onto the "P" control terminal of the trigger 40; and trigger 40 at this time also changes state (from one to zero). Thus, the counter is now in its "11" condition in which the first two triggers 20 and 30 are in their one conditions and the trigger 40 is in its zero condition.

Subsequent downcounting takes place in a similar manner. The trigger 20 changes state for each pair of transitions, from plus to minus and then from minus to plus, of the clock signal on lead 62. The trigger 30 changes state under the control of the trigger 20, by means of the exclusive OR-circuit 22 and AND-circuit 24 so that the trigger 30 stays in the same condition for two consecutive counts. The third trigger 40, being controlled from the previous two triggers 20 and 30, remains in the same condition for four counts and then changes. The fourth trigger 50 has its controlling AND-circuit 44 controlled from the previous two triggers, 30 and 40, and this trigger 50 therefore remains in its one condition until the count of seven is reached, and then remains in its zero condition for the remainder of the downcounting. In this connection, it may be noticed that the first AND-circuit 24 is under the control of the exclusive OR-circuit 22 in the same stage and the clock signal; and the subsequent AND-circuits 34 and 44 are each respectively under the control of the exclusive OR-circuit in the same stage, the AND-circuit in the preceding stage, and the clock signal. The AND-circuits 34 and 44 in these subsequent stages each causes a change in state of the trigger in the succeeding stage when the trigger in the same stage as the controlling AND-circuit (34 and 44) is in proper state and when the AND-circuit in the previous stage is in the proper condition to transmit a clock signal therethrough. MOre particularly, referring to FIG. 2, it will be observed that whenever the first trigger 20 is in its one condition, as for example, for a "15" or a "13" state of the counter as a whole, the subsequent downcount is obtained with a change in condition of the second trigger 30 since the second trigger 30 is under the control of the first trigger 20. The third trigger 40 is under the control of the previous two triggers, 20 and 30, and it will be observed that when both of the triggers 20 and 30 are in their zero conditions, the subsequent downcount includes a change of condition of the third trigger 40. The fourth trigger 50, being under the control of the previous two triggers, 30 and 40, changes condition just subsequent to a state of the counter as a whole which includes both of the triggers 30 and 40 in their zero conditions.

For a count up, which is assumed to start from the all zero condition, the direction control bus 68 has a minus potential applied to it. Since all of the triggers 20, 30, 40, and 50 are in their zero condition, they all apply a minus signal on their outputs 21, 31, 41, and 51. Therefore all the exclusive OR-circuits 22, 32, 42, and 52 have two negative inputs, and they therefore provide positive potentials on their output leads 23, 33, and 43. Therefore the associated AND-circuits 24, 34, and 44 block the clock signal from lead 62, transmitted through AND-circuit 60 to lead 66, with respect to the triggers 30, 40, and 50. The first trigger 20 always has the clock signal applied to its control terminal "P"; and, therefore, on the first pair of transitions of the clock signal from plus to minus and then from minus to plus, the condition of the trigger 20 changes, which is from a zero to a one condition. The counter is now in its "1" state as indicated on the FIG. 2 table.

With the trigger 20 being in its one condition, it provides a positive signal on its output lead 21, and this positive signal is effective on exclusive OR-circuit 22 so that circuit 22 has both a negative and a positive input and therefore has a minus output on lead 23. Therefore, when the clock signal on leads 62 and 66 subsequently goes from plus to minus in potential, AND-circuit 24 allows the clock signal to pass through it on to the second trigger 30. Trigger 30 is thus changed in state from zero to one, and its output on lead 31 changes from minus potential to plus potential. The first trigger 20 is always under the effect of the clock signal on leads 62 and 66 as previously described; and, therefore, at the same time, the condition of trigger 20 changes, this change being from its one state to its zero state. The counter is then in its "2" state.

The succeeding pair of transitions of the clock signal, first from plus to minus and then from minus to plus, causes the trigger 20 to change from its zero condition to its one condition, and the counter as a whole is in its "3" state as indicated on FIG. 2.

The succeeding pair of transitions of the clock signal on leads 62 and 66, first from plus to minus and then from minus to plus, is effective on the third trigger 40. When the triggers 20 and 30 are both in their one state, they apply minus signals on leads 25 and 33 and onto the AND-circuit 34 controlling the trigger 40; and, therefore, the clock signal on lead 66 passes through the AND-circuit 34 and is impressed on the control terminal "P" of the trigger 40, causing trigger 40 to change from its zero condition to its one condition. The counter as a whole, therefore, is now in its "4" state as indicated on FIG. 2.

Succeeding pairs of transitions of the clock signal, from plus to minus and then from minus to plus, causes the trigger 20 to change in condition with each pair of transitions, causes the trigger 30 to change in condition for every other pair of transitions of the clock signal, causes trigger 40 to change in condition for every four pairs of transitions, and causes the trigger 50 to change in condition for every eight pairs of transitions. This functioning of the trigger 30 is due to the operation of the controlling AND-circuit 24 which is under the control of the previous trigger 20 in the counter; and this functioning of the trigger 40 is due to the operation of its controlling AND-circuit 34 which is under the control of both of the preceding triggers 20 and 30 in the counter. Likewise, the trigger 50 functions in the manner stated since its controlling AND-circuit 44 is under the control of the previous two triggers 30 and 40 in the counter. More particularly, referring to FIG. 2, it will be observed that the second trigger 30 is caused to change in condition on the subsequent upcount from the state of the counter as a whole in which the first trigger 20 is in its one condition, for example, the "1" and "3" states of the counter as a whole. The third trigger 40 is under the control of the previous two triggers, 20 and 30, and it will be observed that the third trigger 40 changes condition on the subsequent upcount from a state of the counter as a whole in which the first two triggers are in their one conditions, for example, in changing from the "3" to the "4" states of the counter as a whole. The fourth trigger 50 is under the control of the previous two triggers, 30 and 40, and the fourth trigger 50 changes state on a subsequent upcount form the state of the counter as a whole in which the second and third triggers, 30 and 40, are in their one conditions, for example, in changing from a "7" to an "8" state of the counter as a whole.

A signal on the lead 55, when a plus potential is applied onto the directional control bus 68, indicates that all of the triggers 20, 30, 40, and 50 are in their zero conditions. For their zero conditions, all of the triggers 20, 30, 40, and 50 have negative potentials on their outputs 21, 31, 41, and 51. Therefore, at this time, all of the exclusive OR-circuits 22, 32, 42, and 52 have negative outputs on the leads 23, 33, 43, and 53. Therefore, the first AND-circuit 24 has a negative output due to the negative input from the OR-circuit 22; and, since the output of the first AND-circuit 24 constitutes one of the inputs to the AND-circuit 34, together with the negative input from the OR-circuit 32 through lead 33, all of the inputs to the AND-circuit 34 are negative at minus clock time to provide a minus signal on lead 35. The AND-circuit 44 functions to provide a minus signal on lead 45 similarly, and likewise the three inputs to the AND-circuit 54 are negative at minus clock time so as to provide the all zero decode signal on lead 55 at minus clock time.

An analysis of the operation of the counter similar to the analysis given above in downcounting and upcounting will indicate that, if the potential of the direction control bus 68 is changed from minus to plus while the counter is counting up, the counter will immediately begin to count down. Similarly, if the potential on the direction control bus 68 is changed from plus to minus while the counter is counting down, the counter will immediately change the direction of count so as to count up.

Although only four triggers, 20, 30, 40 and 50 are shown in FIG. 1, it will be apparent that additional stages, in addition to the stages 10, 12, 14, and 16, may be inserted into the counter between the third stage 14 and the $n^{th}$ stage 16 so as to provide greater counting capacity of the counter. The additional stages will be the same as the stages 12 and 14 and each will be connected to the preceding stage in the same manner as the stage 14 is connected to the stage 12.

It is to be understood that the invention is not to be limited to the specific arrangement shown and described, except only insofar as the claims may be so limited, as it will be apparent to those skilled in the art that changes may be made without departing from the principles of the invention.

What is claimed is:

1. Counting mechanism comprising:

means providing an alternating clock signal, a direction control lead adapted to have two signal levels applied thereon for the purpose of causing the counter to count in one direction or the other, the counter including a plurality of tandem connected stages and each of the stages including a bistable device changeable in condition by the transition of a control signal applied thereto, each of the lower stages of the counter including a circuit having two inputs providing a certain output level when the inputs are the same and a different output level when the inputs are different, and a circuit driven from said first-named circuit and having a plurality of inputs and providing an output only when the inputs are the same, said second-named circuit of each of said lower stages being connected to drive the bistable device and said second-named circuit of the succeeding stage, said clock signal providing means being connected as an input to said bistable device of said first stage and to said second-named circuit in each of the lower stages, said direction control lead being connected as an input to each of said first-named circuits whereby the clock signal causes the counter to count up for a certain signal level on said direction control lead and to count down for a different signal level on said direction control lead.

2. Counting mechanism comprising:

means providing an alternating clock signal, a direction control lead adapted to have different signal levels applied thereto, the counting mechanism including a plurality of tandem connected counter stages each of which has a trigger changed in condition by a transition of a control signal applied thereto, each of the lower stages in the counting mechanism including an exclusive OR-circuit driven from the trigger of that stage and an AND-circuit driven from the exclusive OR-circuit of that stage, each of said AND-circuits being connected to drive the trigger of the succeeding stage and the AND-circuit of the succeeding stage, said clock-signal-providing means being connected as inputs to the trigger of said first stage and to said AND circuits and said direction control lead being connected as inputs to said OR circuits whereby the clock signal causes the counting mechanism to count up for one signal level on said direction control lead and to count down for another signal level on said direction control lead.

3. Counting mechanism as set forth in claim 2, each of said AND circuits being arranged to provide a minus potential output when the inputs to the AND circuits are all at minus potential.

4. Counting mechanism as set forth in claim 2, each of said OR-circuits providing a positive potential output when the inputs to the OR circuit are either both at positive potential or at negative potential and providing a minus potential output when the inputs to the OR circuit are of different polarity.

5. Counting mechanism as set forth in claim 2, said triggers each being responsive to a change of input signal from minus potential to plus potential and providing a positive potential output for one of its conditions and a negative potential output for another of its conditions.

6. Counting mechanism as set forth in claim 2, and including an AND circuit having said alternating clock signal providing means connected thereto as an input and also having a reset lead connected thereto as an input and providing said clock signals as inputs to said AND circuits and to said trigger in said first stage when a certain potential level is applied onto said reset lead, said reset lead also being connected with reset terminals of said triggers so that another voltage level on said reset lead causes a resetting of each of the triggers to a certain state of the trigger.

7. Counting mechanism as set forth in claim 2, the last stage of the counting mechanism also including an exclusive OR circuit driven by the trigger of that stage and connected with said direction control lead and an AND circuit driven by the OR circuit of that stage, said last-named AND circuit also being driven from the AND circuit of the preceding stage and being connected with the alternating clock signal so that the output of this AND circuit indicates an all zero condition of the triggers, in which all of the triggers are in a certain condition, when a certain signal level is applied onto said direction control lead.

8. Counting mechanism as set forth in claim 2, in which each of said OR circuits provides an output of plus potential when the inputs to the OR circuits are either both plus or both minus potential and provides an output of minus potential when the inputs are of different polarity, and in which each of said AND circuits provides a minus potential output when all of the inputs to the AND circuits are of minus potential.

9. Counting mechanism as set forth in claim 8, each of said triggers being arranged to change its state on a transition of a control signal applied thereto from minus potential to plus potential and providing an output signal of minus potential for one of the conditions of the trigger and an output signal of plus potential for the other condition of the trigger.

* * * * *